Nov. 11, 1958 M. GREEN 2,859,613
MULTIPLE BENDING BEAM FORCE MEASURING DEVICE
Filed April 6, 1956

INVENTOR.
MALCOLM GREEN
BY
ATTORNEY

2,859,613

MULTIPLE BENDING BEAM FORCE MEASURING DEVICE

Malcolm Green, Waban, Mass., assignor to Baldwin-Lima-Hamilton Corporation, a corporation of Pennsylvania Application April 6, 1956, Serial No. 576,619

6 Claims. (Cl. 73—141)

This invention relates generally to force measuring devices and more particularly to a bending beam type load cell employing electrical impedance strain gage means for determining an applied load in terms of strain induced by the load.

Many arrangements of bending beams have been proposed and used for force measurement but, for certain applications, the beams have had serious structural and functional limitations particularly where compactness and low deflection were desired.

One object of my invention is to provide an improved force measuring bending beam type of device that has a high degree of strain sensitivity with minimum deflection.

A further object of my invention is to provide an improved beam type force sensing device that has a high degree of compactness, ruggedness, and stability both laterally and in the direction of bending all without in any way sacrificing the favorable characteristics of sensitivity and accuracy of bending beam type of sensing elements.

Other objects and advantages will be more apparent to those skilled in the art from the following description of the accompanying drawings in which.

Figure 1:
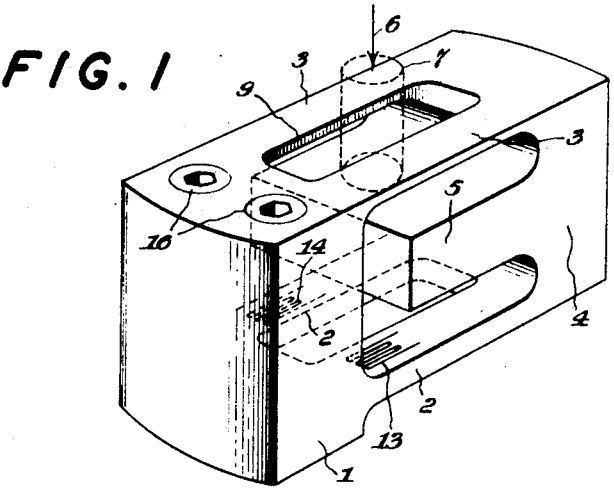
Fig. 1 is a perspective of one form of my improved bending beam.

In the particular embodiment of the invention which I have shown herein for the purpose of illustrating one specific form among possible others that the invention might take in practice, I employ a preferably solid rectangular block of material and then mill out or otherwise form openings therein to create a base 1 from which projects a relatively thick bending beam 2 and a relatively thin flexure guide plate 3 connected together at their outer movable ends by a relatively heavy section 4. A reversely extending load receiving continuation 5 of the beam projects from the movable connecting portion 4 inwardly between and substantially parallel to the beam 2 and flexure plate 3. The flexure plate 3 is in effect a beam. For machining purposes the inward continuation 5 is preferably equally vertically spaced from the beam 2 and plate 3. This reversely extending beam continuation is adapted to receive either a tension or compression force 6 preferably transmitted through a rod shown in dotted lines 7 which may be secured in a threaded opening 8 located preferably on the longitudinal (lengthwise) axis of the extension.

To allow a rod such as 7 to have direct vertical access to the load receiving beam extension 5, I provide a suitable opening 9 through the top flexure plate 3. This opening may, if desired, be of an elongated nature, as shown, thereby dividing the flexure plate 3 into two portions. If desired, the relatively heavy bending beam section 2, which carries substantially the entire load, may also be divided into two lengthwise sections similar to those of the flex plate 3. By transversely spreading the two halves of the flex plate and bending beam, the transverse stability of the device is considerably increased.

Figure 2:
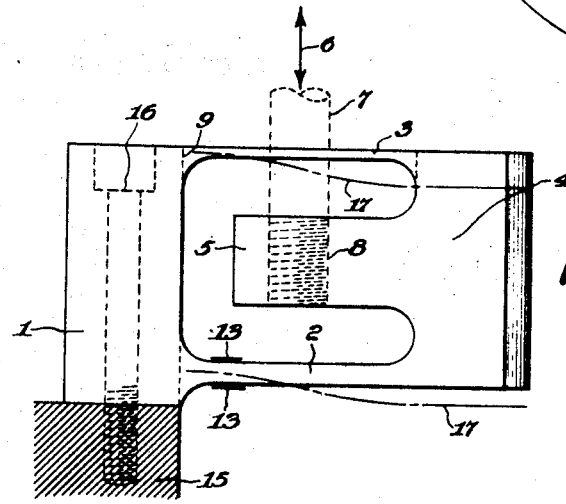
Fig. 2 is a side elevation of the beam.
Figure 3:
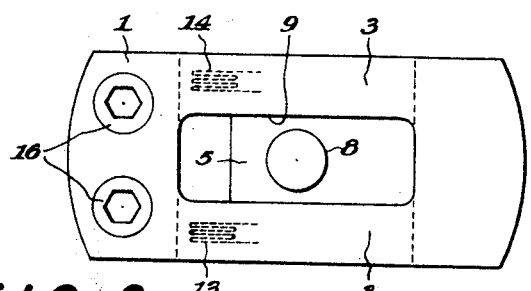
Fig. 3 is a plan view.

Electrical impedance strain gage means, preferably in the form of bonded electrical resistance filament type gages 13 and 14, are secured preferably to both the top and bottom surfaces of the beam 2 as shown in Fig. 2. As is well known, the change of electrical resistance of the strain gages in response to a given applied load is measured by any suitable electrical measuring circuit such, for example, as a Wheatstone bridge. The strain gages thus perform, broadly, the function of measuring the degree of deflection for a given applied force and accordingly constitutes deflection measuring means.

In operation of this device it will be secured to any suitable structure 15 by bolts 16 extending through the base 1. Hence, upon application of a vertical force 6 to the reverse beam extension 5 the strain sensing beam 2 will flex to induce a strain in the strain gages 13 and 14 while the flexure plate 3, which is of the same length as the bending beam 2, will insure that the load will be applied vertically at all times. The beam and flex plate will, upon flexure, have a reverse bend similar to an S-shaped curve as illustrated by lines 17, 17, although the degree of flexure may be much smaller than shown. Inasmuch as the function of the divided flexure plate 3 is to guide the inward beam extension 5 vertically the flex plate may be relatively thin as compared to the strain sensing bending beam portion 2 although the flexure plate and bending beam 2 may be made of equal thickness and gages applied to each if so desired where deflection is not important. However, by making the beams of unequal thickness, it is possible to decrease the deflection of the cell while maintaining the same output, i. e., electrical resistance change of the gages. This has the desirable effects of increasing frequency response, making it easier to hermetically seal the device into a load cell, and making it easier to apply the cell, especially to weighing applications. In any event, both the beam portion 2 and flex plate 3 are relatively thin compared to the rigid base 1, connecting end 4, and inward beam extension 5 thereby insuring maximum effectiveness in producing strain in the beam 2 in response to a given load. The non-flexible connecting element 4 insures that the beam and flex plate maintain the inward beam extension in a horizontal position at all times so that the measured load force is always vertical. This horizontal position of the extension member 5 is also maintained because such member is non-flexible in the direction of bending of beam 2 and flex plate 3. Hence such member is adapted to receive a load, to be measured, applied in the direction of bending of the beam so that flexure thereof is a measure of the applied force. The terms vertical and horizontal are merely relative terms inasmuch as the device can be used in any position desired without affecting its operation or results. In other words, a force to be measured is applied substantially perpendicularly to extension 5. Also, my device may be fabricated from separate components instead of from a single integral block.

Another advantage of the twin-beam configuration is that it is relatively insensitive to side forces or moments. Reactions of this type put beams 2 and 3 into tension and compression, thus straining all gages equally and producing no net bridge unbalance.

From the foregoing disclosure it is seen that I have provided an extremely compact cantilever bending beam type force sensing device while at the same time not only maintaining the maximum effectiveness with which a bending beam can measure forces with electrical impedance strain gage means but also of assuring straight line application of a load force to the compact force measuring device.

It will, of course, be understood that various changes in details of construction and arrangement of parts may be made by those skilled in the art without departing from

I claim:

1. A force measuring device comprising, in combination, a bending beam, a base for rigidly supporting one end of the beam while its other end is free to move, a flexure plate also having one end rigidly supported by said base while its other end is free to move, said beam and flexure plate being disposed substantially parallel to each other, means for rigidly connecting together the movable ends of the beam and flexure plate to maintain the same substantially in parallelism along an S-shaped curve during movement of their free ends, and a member, non-flexible in the direction of bending of the beam, rigidly connected to said connecting means and extending inwardly toward said base between said bending beam and flexure plate to receive a load, to be measured, applied in the direction of bending of the beam so that flexure thereof is a measure of the applied force.

2. The combination set forth in claim 1 further characterized by the provision of means whereby a force to be measured may be applied substantially perpendicularly to the inward extension along a line intersecting the length of the beam.

3. The combination set forth in claim 1 further characterized in that the flexure plate comprises two parallel portions laterally spaced apart to provide an opening through which the force may be applied to said inward extension.

4. The combination set forth in claim 1 further characterized in that the base and the means for rigidly connecting together the movable ends of the beam and flexure plate together with the inwardly extending non-flexible member have substantially the same width as the beam.

5. The combination set forth in claim 1 further characterized in that the non-flexible inwardly extending member is formed integrally with the means for rigidly connecting together the movable ends of the beam and flexure plate.

6. The combination set forth in claim 1 further characterized in that the non-flexible inwardly projecting member has a thickness substantially equal to the thickness of the means for rigidly connecting together the movable ends of the beam and flexure plate.

References Cited in the file of this patent

UNITED STATES PATENTS

| | | |
|---|---|---|
| 2,359,245 | Ritzmann | Sept. 26, 1944 |
| 2,598,812 | Marco | June 3, 1952 |
| 2,683,985 | Smulski | July 30, 1954 |
| 2,775,890 | Waldron | Jan. 1, 1957 |